(No Model.) 2 Sheets—Sheet 1.
H. W. CHAMBERLAIN & F. G. HARRIS.
RUNNING GEAR FOR VEHICLES.
No. 285,227. Patented Sept. 18, 1883.
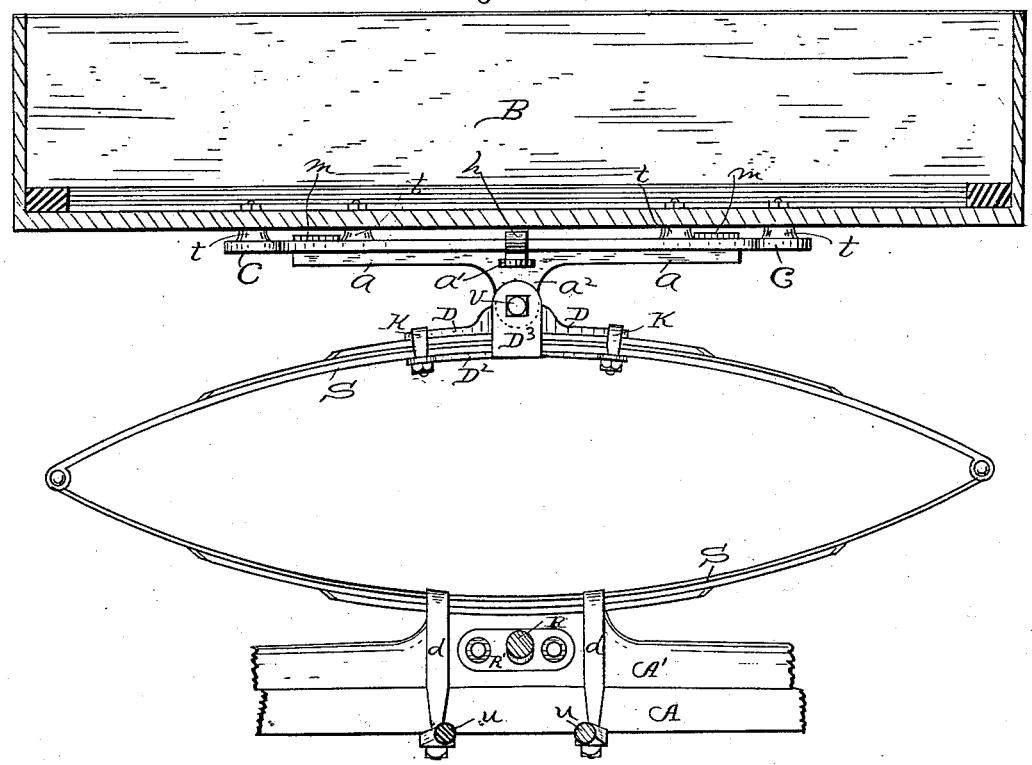
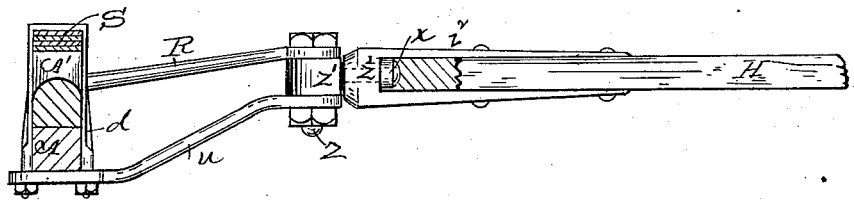
Witnesses.
Geo J Munroe
D. D. Simmonds
Inventors.
Harvey W Chamberlain
Frederick G Harris
per Geo J Munroe attorney (No Model.) 2 Sheets—Sheet 2.

H. W. CHAMBERLAIN & F. G. HARRIS.
RUNNING GEAR FOR VEHICLES.

No. 285,227. Patented Sept. 18, 1883.

Witnesses.

Inventors.
Harvey W. Chamberlain
Frederick G. Harris
per Geo J Munroe Attorney.

UNITED STATES PATENT OFFICE.

HARVEY W. CHAMBERLAIN AND FREDRICK G. HARRIS, OF LOCKPORT, ASSIGNORS OF ONE-HALF TO MARX A. LESEM AND MOSES S. GREENEBAUM, BOTH OF CHICAGO, ILLINOIS.

RUNNING-GEAR FOR VEHICLES.

SPECIFICATION forming part of Letters Patent No. 285,227, dated September 18, 1883.

Application filed July 2, 1883. (No model.)

*To all whom it may concern:*

Be it known that we, HARVEY W. CHAMBERLAIN and FREDRICK G. HARRIS, citizens of the United States, residing at Lockport, in the county of Will and State of Illinois, have invented certain new and useful Improvements in Vehicle-Gears; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of our invention is to provide a strong, durable, practical, and at the same time simple, vehicle-gear, so constructed and arranged that the vehicle, particularly the springs and king-bolt, are relieved from the strain of the twisting of the body in passing over obstructions or rough and uneven ground.

Our invention consists in the peculiar combination and arrangement of parts, as hereinafter fully set forth.

Figure 3:
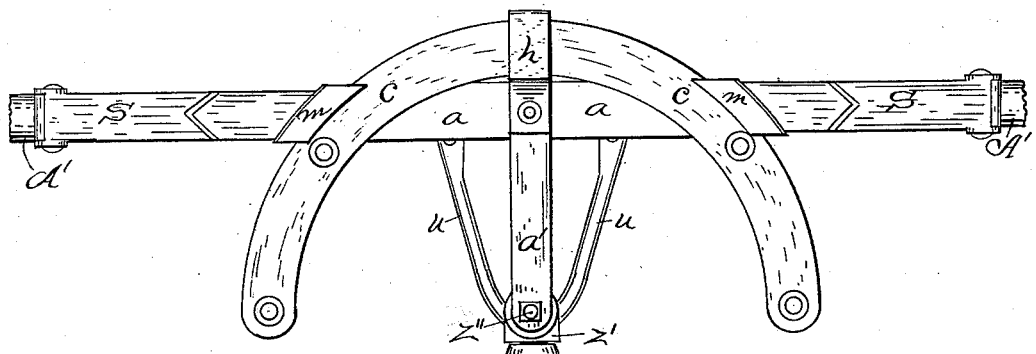
Figure 4:
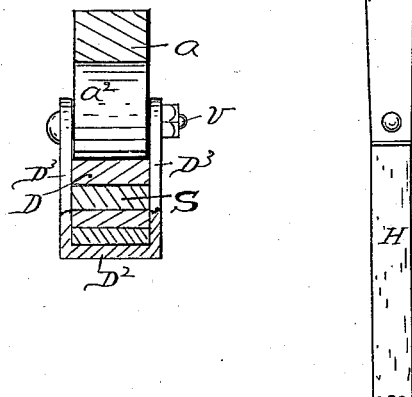

In the accompanying drawings, Figure 1 is a sectional view of our improved gear, just in the rear of the front spring of a vehicle. Fig. 2 is a sectional view of our improved jointed and swiveled reach. Fig. 3 is a top view of our circle or fifth-wheel and the front end of our improved jointed and swiveled reach with the body of the vehicle left off, and Fig. 4 is a detailed sectional view of some of the parts enlarged.

Similar letters of reference refer to similar parts wherever used in the several views.

In the said drawings, A represents the steel axle, A' being the wood axle, as shown in Figs. 1 and 2.

B is body or vehicle-box.

C is the circle or fifth-wheel, which is secured directly to the bottom of the body B. Said circle C is secured to the plate $a$ by means of the guideways $h$ and $m$ in such a manner as to allow it to slide or move through said guideways $h$ and $m$ forward or backward, as the occasion demands.

$a^2$ is a lug which forms a part of the plate $a$.

D D are socket-plates, which are secured by means of the clips K K to the spring S, on either side of the lug $a^2$, in such a manner as to form a socket for its rest.

$D^3$ are ears which form a part of the plate $D^2$, and extend upward on either side of the lug $a^2$. To further secure said lug $a^2$ in the socket formed by the socket-plates D D, a bolt, U, passes through said ears $D^3$ and lug $a^2$, as shown in Figs. 1 and 4. From the foregoing it will be readily seen that said lug $a^2$ is allowed to oscillate freely in its socket, and by means thereof the body or box B will oscillate as required.

$d\ d$ are clips which attach the spring S to the axles A and A', as shown in Fig. 1.

H is our improved jointed swiveled reach, which is composed of the swivel-head Z' and the swivel-link $Z^2$, which revolves freely upon said swivel-head Z', and is retained thereon by the swivel-washer X.

R and $u$ are braces. Said braces $u$ are attached to the axles A and A' by means of the clips $d$, as shown in Fig. 1. The brace R is bolted to the axle A' by means of a T-head, R', as shown in Fig. 1. The said braces R and $u$ are attached to the swivel-head Z' by means of the bolt Z in such a manner as to allow said swivel-head Z' to revolve freely upon said bolt Z between the said braces R and $u$, as shown in Fig. 2.

$a'$ is an arm, which is attached to the body B by the bolt Z'', and $t$ are bosses attaching the circle C to the body B.

The advantages of this gear are obvious and numerous. The fifth-wheel C, being a half-circle, can be made at one-half the expense of the usual full circle or fifth-wheel. It is relieved of unnecessary weight by being secured to the bottom of the body B, and therefore need not be constructed of as strong material as a circle under the springs. By reason of the jointed swivel-reach the body is relieved from any unnecessary strain when the wheels pass over uneven ground; also, by reason of the braces above and below the swivel-head Z' the strain is equal in all directions, the front wheels are given a longer circle, and thereby the vehicle can make a shorter turn.

Having thus described our invention, that which we claim as new, and desire to secure by Letters Patent, is—

1. In a vehicle-gear, the combination, with the plate $a$ and its lug $a^2$, of a spring, S, the plate $D^2$, having ears $D^3$, the socket-plates D D, and clips K K, substantially as set forth.

2. In a vehicle-gear, the combination, with the front axle and the braces R and $u\ u$, secured thereto, of a reach having a swivel-link $Z''$ and swivel-head $Z'$, the latter being pivotally secured between the braces R and $u\ u$, substantially as set forth.

In testimony whereof we affix our signatures in presence of two witnesses.

HARVEY W. CHAMBERLAIN.
    FREDRICK G. HARRIS.

Witnesses:
    S. O. SIMOND,
    GEO. WILKINSON.